United States Patent [19]

Martino

[11] Patent Number: 4,499,212

[45] Date of Patent: Feb. 12, 1985

[54] THERMOSETTING ACRYLIC LATEXES

[75] Inventor: Phillip C. Martino, Brunswick, Ohio

[73] Assignee: SCM Corporation, New York, N.Y.

[21] Appl. No.: 575,224

[22] Filed: Jan. 30, 1984

Related U.S. Application Data

[63] Continuation-in-part of Ser. No. 416,911, Sep. 13, 1982, abandoned.

[51] Int. Cl.³ .................................................. C08L 0/00
[52] U.S. Cl. ..................................... 523/201; 524/812; 526/80
[58] Field of Search ....................... 523/201; 524/812; 526/80

[56] References Cited

FOREIGN PATENT DOCUMENTS 2034334 10/1979 United Kingdom .

Primary Examiner—Joseph L. Schofer
Assistant Examiner—T. M. Reddick
Attorney, Agent, or Firm—Thomas M. Schmitz

[57] ABSTRACT

The invention pertains to sprayable latex polymers produced by step-wise polymerization of ethylenically unsaturated monomers comprising alkylol acrylamide monomer, functional monomers, and other monomers, wherein the alkylol acrylamide monomers are copolymerized in the second stage monomer addition to preferentially locate alkylol acrylamide groups in the surface portion of the latex polymer particles.

9 Claims, No Drawings

THERMOSETTING ACRYLIC LATEXES

BACKGROUND OF THE INVENTION

This application is a continuation-in-part of copending application Ser. No. 416,911 filed Sept. 13, 1982 now abandoned.

This invention relates to polymeric compositions and processes particularly useful in surface coating compositions, and more particularly pertains to certain reactive self-curing latexes useful as binders in coating compositions.

Water-based coating compositions useful as coatings for metal containers and based on latex polymers are suggested in U.S. Pat. No. 3,991,216. Such polymers are based on interpolymers of copolymerized acrylamide monomer, carboxylic monomer, and other ethylenically unsaturated monomers. However, such polymers are difficult to spray and often exhibit deficient film properties such as lack of resistance to ethanol. Other patents disclosing similar latexes are U.S. Pat. No. 2,978,434 and U.K. Pat. No. 2,034,334, which suggest that premature condensation of emulsion copolymerized alkylol acrylamide derivatives with functional monomers having carboxyl, hydroxyl, or similarly reactive functional groups can be eliminated by copolymerization in two stages. These references teach that first stage monomers contain no alkylol acrylamide monomer and are copolymerized under acidic conditions at 70°–80° C., but second stage monomers containing an alkylol acrylamide together with other functional monomers containing hydroxyl or carboxyl groups are copolymerized under neutral or slightly alkaline conditions at temperatures no greater than 50° C. The disclosed two-stage processes avoid condensation reactions until the coating is baked as a film onto the desired substrate. Similarly, *Journal of Coatings Technology*, Vol. 51, No. 657 (Oct. 1979) discloses low molecular weight acrylamide latexes adapted to crosslink upon curing as a film.

The present invention discloses a high molecular weight two-stage thermosetting acylic emulsion copolymer containing crosslinked surface polymer chains and carboxyl and methylol acrylamide functionalities particularly useful in the formulation of coatings. The advantage of this invention over similar inventions include improved viscosity stability of the latex/solvent blend due to reduced/controlled particle swelling, improved mechanical stability of the latex resulting in better spray performance of the coating (measured by coverage and blister), and more efficient utilization of expensive self-cure monomers.

It now has been found that certain reactive self-curing latexes containing copolymerized monomers including functional carboxyl, hydroxly, amine or amide monomers in combination with alkylol acrylamide monomers polymerized in a stepwise reaction to concentrate the alkylol acrylamide on the surface of the latex polymer particles provides an improved latex exhibiting surprisingly good rheological properties including spray application. The second stage polymerization takes place at temperatures above about 70° C. wherein a minor amount of alkylol acrylamide reacts with a minor amount of functional monomer during the addition polymerization of ethylenic monomers to produce crosslinked polymer chains in the polymer surface and to provide a relatively rigid or hard polymer particle surface, which appears to stabilize the latex viscosity as well as provide considerable shear resistance during subsequent spray application of the latex. Upon ultimately heat curing of the latex, the latex becomes self-curing by the alkylol acrylamide reacting with the functional monomer groups in the latex. The reactive self-curing latex polymers are high molecular weight polymers containing extremely high molecular weight crosslinked surface polymer chains. The polymer particles advantageously provide good film integrity properties, high solids content, good spray application, and minimal use of solvents. Accordingly, it now has been found that some condensation of functional momoners during the emulsion copolymerization is very advantageous to provide crosslinked polymer chains, viscosity stability, and spray performance without detracting from overall coatings performance.

High pressure spray applications cause severe mechanical shear upon latex particles resulting in very poor spray performance. It is believed that staging the monomer feed in accordance with this invention results in latex particles having a core/shell morphology whereby copolymerization of the monomers in the latter stage under acidic conditions induces a certain degree of surface crosslinking in accordance with this invention. The effect of this crosslinking combined with the steric rigidity imparted by the aromatic vinyl monomer results in a high structured and immobile particle surface. The addition of polymer soluble solvents (e.g., n-butanol) widely employed in water-reducible spray applications have only limited effect on swelling of the latex particle. With this controlled particle swelling, integrity of the latex particles is preserved and viscosity instability associated with long term particle swelling is minimized. Maintenance of latex particle integrity also assists ionic stabilization, which act directly to increase shear stability and thereby improve spray performance. These and other advantages of this invention will become more apparent by referring to the detailed description of the invention and the illustrative examples herein.

SUMMARY OF THE INVENTION

Briefly, the invention is based on a certain self-curing latex produced by polymerizing ethylenic monomers, including functional carboxyl, hydroxyl, amine or amide monomers in combination with alkylol acrylamide monomers, in step-wise polymerization to preferentially locate the alkylol acrylamide on the surfen of the latex polymer particles wherein a minor amount of said acrylamide reacts with a minor amount of functional monomer to produce cross-linked surface polymer chains. The composition of this invention comprises the self-curing latex produced by said step-wise process wherein the alkylol acrylamide is copolymerized at temperatures above 70° C. ;

DETAILED DESCRIPTION OF THE INVENTION

In accordance with this invention, the composition comprises certain reactive self-curing latexes, wherein the reactive self-curing latex polymer is an emulsion polymer of copolymerized ethylenically unsaturated monomers comprising (i) reactive carboxyl, hydroxyl, amine or amide functional monomers, (ii) alkylol acrylamide and preferably alkylated alkylol acrylamide monomers, and (iii) other ethylenically unsaturated monomers. The self-curing latex is synthesized by step-wise polymerization of monomers in water by first polymerizing a portion of the ethylenic monomers and subsequently polymerizing the remaining monomers including the alkylol acrylamide monomers in the second polymerization step at temperatures above about 70° C. The two-stage monomers can be proportioned on a weight basis from 25/75 to 75/25 first stage monomers. In accordance with this invention, core-shell polymer particles are produced containing a minor amount of the copolymerized alkylol acrylamide monomer crosslinked with a minor amount of the copolymerized functional monomer in the shell or polymer surface portion of the polymer particles. The remaining copolymerized but non-crosslinked allkylol acrylamide is preferentially oriented on the polymer surface whereby acrylamide groups are available for subsequent reaction with functional groups during the curing stage to render the polymer particles self cross-linking. The alkylated alkylol acrylamide monomers can be derivatives of acrylamide, methacrylamide, methylol acrylamide, or similar alkyl modified acrylamide monomer as shown for example in U.S. Pat. Nos. 3,991,216; 4,097,438; and 4,305,859. The acrylamide monomers preferably are alkylated with an alkyl group such as methyl, ethyl, propyl, n-butyl or iso-butyl, and similar alkylated alkylol acrylamide monomers, wherein the butylated monomers are preferred. Functional monomers include carboxyl, hydroxyl, amino and amido functional groups containing monomers. Carboxyl containing monomers include acrylic acid and lower alkyl substituted acrylic acids wherein the preferred carboxylic monomers are acrylic and methacylic acids. Hydroxyl containing monomers are hydroxy containing ethylenically unsaturated monomers including hydroxy alkylacrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers. Other reactive monomers include N-methylol acrylamide or methacrylamide monomers. The remaining monomers that can be copolymerized with the alkylol acrylamide monomer and functional monomers to form a reactive self-curing latex polymer are ethylenically unsaturated monomers including vinyl monomers, for example, vinyl esters such as vinyl acetate, vinyl proprionate, vinyl butyrates, vinyl benzoate, isopropenyl acetate and similar vinyl esters; and vinyl halides such as vinyl chloride. Other ethylenically unsaturated monomers can include, for example, those monomeric materials exhibiting ethylenic double bond unsaturation such as polymerizable allylic, acrylic, fumaric, maleic, or like ethylenically unsaturated double bond functionality. Ethylenically unsaturated monomers can include, for example, styrene, methyl styrenes, and similar alkyl styrene, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers. Further suitable ethylenically unsaturated monomers include acrylic unsaturated monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction producrs such as butyl, phenyl, and cresyl glycidyl ethers reacted with acrylic and methacrylic acids, hydroxyl alkyl acrylates and methacrylates, as well as amino acrylates and methacrylates.

The monomer mix preferably contains at least one vinyl aromatic hydrocarbon (e.g., stryene), one or more alkyl acrylate or methacrylate, at least one unsaturated carboxylic acid (methacrylic acid is preferred), and one or more alkylol acrylamide (preferably alkylated) monomers. Additional functional monomers to facilitate crosslinking may also be included (e.g., hydroxyl, amine, epoxy) at various levels in the monomer mix. The first stage contains at least one monomer from each classification described above, except the alkylol acrylamide derivative, and comprises between 30-70% of the total monomers. The second stage should contain momoners already included in the first stage, plus 3-15% alkylol acrylamide derivative (based on total momomer). It is preferred that the monomer composition of the two stages be similar, particularly regarding carboxyl monomer level, and polymer Tg, which insures compatability between the two monomer stages and precludes unnecessary agglomeration during synthesis.

In accordance with the best mode of this invention, preferably the two monomer stages are sequentially emulsion copolymerized during 6-8 hours at temperatures preferably beween 70° C. to 80° C. utilizing standard semi-continuous methodology. Monomer conversion is routinely 99.8% and the final non-volatile content is usually 45-55%. Latex particle size is determined by the level of primary surfactant in the initial reactor charge. The preferred particle size is 2000-4000 Å for optimum spray performance, although this range can be expanded for other application purposes since particle size has been found to have little effect upon coatings performance. Polymer Tg is also imporant for spray application characteristics, and the Tg should be between about 0° C. and 70° C.

In preparing the reactive self-curing latex copolymer, the ethylenically unsaturated monomers are copolymerized in water by the two-step polymerization described above through free radial induced polymerization using peroxy or azo catalysts, include various peroxygen compounds such as pursulfates, benzoyl perioxide, t-butyl hydroperoxide, cumene hydroperoxide, and similar peroxide catalysts; and azo compounds such as azo bis-isobutyronitrile and dimethylazobis-isobutyrate. Initiating systems further include alkaki metal persulfate or ammonium persulfate with or without a reducing substance adapted to activate the persulfate. The initiators or catalysts ordinarily are used at a level of about 0.1% to 1% by weight of monomers. The resulting self-curing water dispersed latex polymer contains by weight between 1% and 20% copolymerized akylol acrylamide monomer, between 1% and 20% reactive carboxyl, hydroxyl, amine or amide monomers, and the remaining being other ethylenically unsaturated monomer.

A high desirable sprayable coating composition can be produced based on the reactive self-curing latex polymer as the binder system in the coating. Coating compositions can be based on the latex polymer above or contain a polymer blend. The foregoing matrix polymer compositions can be mixed with a water-dispersable crosslinking component generally referred to as aminoplast resins adapted to heat cure and crosslink with the carboxyl functionality of the matrix copolymer. On a polymer weight basis, the coating composition contains between 0% and 15% aminoplast crosslinking resin mixed with between 85% and 100% of the above indicated matrix polymer mixtures.

For spraying, preferably the coating composition contains between about 10% and 30% by weight polymeric solids relative to 70% to 90% water including other volatiles such as minor amounts of solvent. For applications other than spraying, the aqueous polymeric dispersions can contain between about 10% and 40% by weight water. Organic solvents can be utilized to facilitate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food uses, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is curved thermally at temperatures in the range from about 95° C. to about 235° C. or higher for time sufficent to effect complete curing as well as volatilizing of a fugitive component in the coating. Upon heat curing, the reactive self-curing latex is believed to become reactive whereby the alkyl chain of the alkoxy acrylamide splits from the alkylol acrylamide chain whereby the acrylamide chain of latex polymer reacts with the functional monomer groups of carboxyl, hydroxyl, or amido groups, or can react with an aminoplast crosslinking resin if present.

For a better understanding of the present invention, the following examples are provided. In this application, all parts are parts by weight, all percentages are weight percentages, and temperatures are degrees Centigrade unless otherwise expressly noted.

EXAMPLE 1

Preparation of a two stage thermosetting acrylic emulsion copolymer containing styrene/ethyl acrylate/methacrylic acid/N-isobutoxy methylol acrylamide.

Loaded 100 parts of deionized water and 0.80 parts MM-80 (Mona Industries tradename for sodium dihexyl sulfosuccinate) into the reactor and heated under nitrogen sparge with agitation to 76°-77° C. At equilibrated reaction temperature the nitrogen sparge was removed and 0.10 parts ammonium bicarbonate added. A mixture of 3.0 parts styrene and 2.0 parts ethyl acrylate was then added to the reactor and emulsified 10 minutes, whereupon 0.25 parts ammonium persulfate were added and allowed to react 20 minutes before starting monomer stage number one.

Monomer stage number one contained 33.0 parts styrene, 26.5 parts ethyl acrylate and 3.50 parts methacrylic acid. This monomer stage was added at a constant rate to the reactor so that addition was complete after 3.0 hours. Monomer stage number two consisted of 14.0 parts styrene, 11.5 parts ethyl acrylate, 1.5 parts methacrylic acid and 5.0 parts N-isobutoxy methylol acrylamide, and was added continuously to the reactor during 1.25 hours. After monomer mix number two was completed, the batch was held for 2 hours at reaction temperature before cooling and filtration.

Monomer stage sizes are not necessarily confined to those described in this example. Satisfactory spray characteristics were obtained when the first stage/second stage ratio was maintained at a ratio of between 25/75 and 75/25.

EXAMPLES 2-10

In a manner similar to Example 1, additional self-cure latices were prepared with the alkylol acrylamide in the second monomer stage also resulting in good spray performance.

EXAMPLES 2-10

|  | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|
| Alkylol Acrylamide | NMA[1] | NMA | NMA/NiBMA[2] | NiBMA | NiBMA | NiBMA | NiBMA | NiBMA | NiBMA |
| Alkylol Acrylamide in Second Stage | 2.0 | 3.0 | 1.0/5.0 | 5.0 | 10.0 | 10.0 | 10.0 | 10.0 | 15.0 |
| Carboxyl Monomer Level | 4.0 | 5.0 | 5.0 | 5.0 | 3.0 | 5.0 | 4.0 | 10.0 | 5.0 |
| Additional Functional Monomer | HEA[3] | none | none | none | none | HEA | none | none | none |
| Additional Functional Monomer Level | 3.0 |  |  |  |  | 5.0 |  |  |  |
| Polymer Tg | ~20° | ~30° | ~40° | ~40° | ~30° | ~20° | ~30° | ~50° | ~30° |
| Other Monomers | 91.0 | 92.0 | 89.0 | 90.0 | 87.0 | 80.0 | 86.0 | 80.0 | 80.0 |

[1] N—Methylol Acrylamide
[2] N—Isobutoxy Methylol Acrylamide
[3] Hydroxy Ethyl Acrylate

EXAMPLES 11-13

In contrast to Examples 1-10, latices were prepared containing an equal quantity of alkylol acrylamide in both monomer stages resulting in poor spray performance.

|  | Ex. 11 | Ex. 12 | Ex. 13 |
|---|---|---|---|
| Alkylol Acrylamide | NMA | NiBMA | NiBMA |
| Alkylol Acrylamide in Second Stage | 3.0 | 5.0 | 10.0 |
| Carboxyl Monomer Level | 5.0 | 5.0 | 5.0 |
| Polymer Tg | 30 | 40 | 50 |

EXAMPLE 14

Load 120 parts (576 lbs.) of DI-water and 0.50 parts (2.4 lbs.) of MM-80 (sodium dihexyl sulfosuccinate) surfactant into the reactor and beat under nitrogen sparge with agitation to 17°-172° F. At equilibrated reaction temperature turn off the nitrogen sparge, add 0.10 parts (218 grams) of ammonium bicarbonate buffer and continue beat and agitation five minutes. Add a mixture of 1.20 parts (5.76 lbs.) styrene and 0.80 parts (3.84 lbs.) ethyl acrylate to the reactor and wait ten minutes. Add 0.30 parts (1.44 lbs.) of ammonium persulfate to the reactor and allow to react twenty minutes before beginning monomer feed number one.

Monomer feed number one consists of 24.0 parts (115.2 lbs.) of styrene, 20.0 parts (96.0 lbs.) of ethyl acrylate, 2.50 parts (12.0 lbs.) methacrylic acid and 0.10 parts (218 grams) MT-70. This monomer feed is added at a constant rate to the reactor so that addition is completed after 2.50 hours. Temperature is maintained at 170°-172° during this addition. Monomer feed number two consists of the monomers in the quantities listed in monomer mix number one with the addition of 5.0 parts (24.0 lbs.) of NiBMA monomer. This monomer mix is added to the reactor over 2.25 hours maintaining 170°-172° F. temperature and sufficient agitation to emulsify the monomers. After monomer mix number two has been completed, the batch is held for one half hour at reaction temperature and 0.01 parts (4.8 lbs.) DI-water is added. The batch is then held at reaction temperature an additional one and one-half hours (1.5 hours) before cooling and filtration.

We claim:

1. In a process for polymerizing ethylenically unsaturated monomers in water to produce self-curing emulsion polymerized polymer particles, the improvement comprising:

polymerizing ethylenically unsaturated monomers in a two-step process by first copolymerizing first stage monomers and then copolymerizing second stage monomers wherein first stage monomers comprise by weight between 30% and 70% of the total monomers, the total monomers comprising by weight (a) between 1% and 20% alkylated alkylol acrylamide, (b) between 1% and 20% functional monomer containing reactive functional groups and selected from carboxyl monomer, hydroxyl monomer, amine monomer, or amide monomer, and (c) other ethylenic monomer, wherein said first stage monomers are said functional monomer (b) and/or said other ethylenic monomer (c), and said second stage monomers comprise alkylated acrylamide monomer (a) and functional monomer (b) and other ethylenic monomer (c), wherein second stage monomers contain 3% to 15% of said alkylated alkylol acrylamide monomer (a) and is a second stage monomer copolymerized in the second step to preferentially orientate alkylol acrylamide groups of said alkylated alkylol acrylamide monomer on the surface portion of the latex polymer particles, and reacting said second stage monomers at temperatures above about 70° C. to react a minor amount of said alkylated alkylol acrylamide monomer with a minor amount of said functional monomer to provide high molecular weight polymer particles containing surface crosslinked polymer chains to provide a sprayable latex adapted to be heat cured and self cross-linking by cross-linking said alkylated alkylol acrylamide groups with said functional groups.

2. The process of claim 1 wherein the acrylamide monomer is an alkylated alkylol acrylamide monomer.

3. The process in claim 1 wherein the acrylamide monomer is a butylated alkylol acrylamide monomer.

4. The process in claim 1 wherein said ethylenically unsaturated monomers comprise by weight between 1% and 20% alkylol acrylamide monomer, between 1% and 20% functional monomer, and the remaining being other ethylenic monomer.

5. The process in claim 1 wherein the functional monomer is selected from carboxyl monomer, hydroxyl monomer, amine monomer, or amide monomer.

6. The process in claim 1 wherein the second stage monomers include a functional monomer.

7. The process in claim 1 wherein a portion of the functional groups on said functional monomer react with a portion of the functional groups on said alkylol acrylamide monomer to provide a hardened cross-linked shell portion of the latex polymer particles.

8. The process in claim 1 wherein the latex is spray applied to a substrate, and said latex is heat cured to cross-link said functional groups with said alkylol acrylamide groups.

9. The latex produced in accordance with the process in claim 1 wherein the latex polymer particles contain a minor amount of alkylol acrylamide and a minor amount of functional monomer crosslinked in the polymer surface to provide a hardened crosslinked shell portion of the latex polymer particles, wherein unreacted alkylol acrylamide is preferentially located in the surface portion of the polymer particles whereby said latex is heat curable and self-crosslinking.

* * * * *